UNITED STATES PATENT OFFICE.

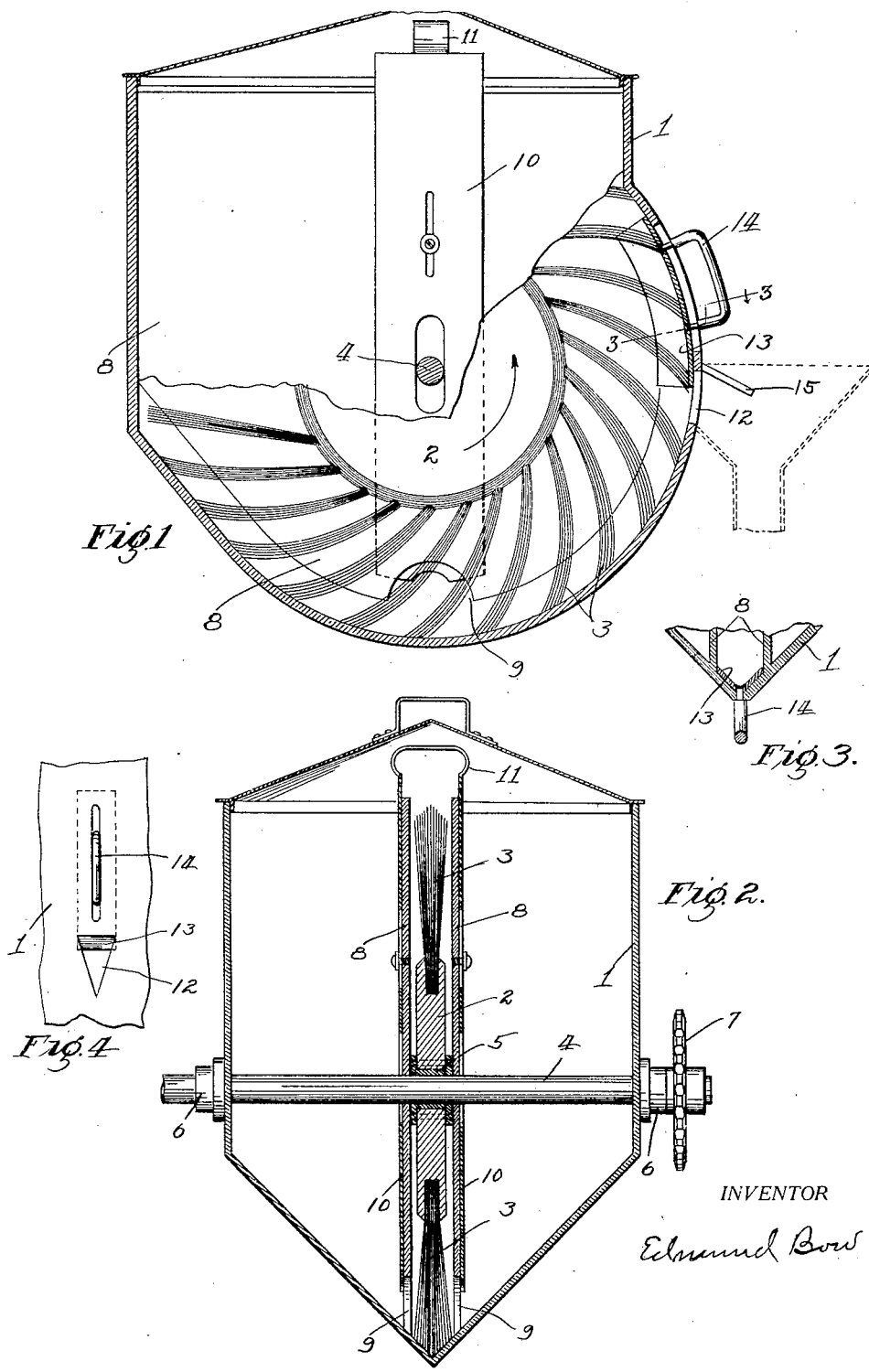

EDMUND BOW, OF ALAMEDA, CALIFORNIA.

SEED-DRILL HOPPER AND SOWING MECHANISM.

1,371,343. Specification of Letters Patent. Patented Mar. 15, 1921.

Application filed December 4, 1919. Serial No. 342,516.

*To all whom it may concern:*

Be it known that I, EDMUND BOW, a citizen of the United States, residing at Alameda, county of Alameda, State of California, have invented certain new and useful Improvements in Seed-Drill Hopper and Sowing Mechanism, whereof the following is a specification.

This invention relates to certain new and useful improvements in seed drill hopper and sowing mechanism. Its object is to obtain an even distribution of the seed in the row and to have the seed as it comes from the hopper in full view of the operator. And it is especially adapted to sowing seed of different size, different shape or different weight, with equal efficiency by the same mechanism requiring only slight and quickly made changes in the position of but two of its parts. Further objects and advantages of the invention will hereinafter appear, and the novel features will be particularly pointed out in the appended claims.

My device is clearly illustrated in the accompanying drawings, which, with numerals marked thereon, form part of the specification and in which Figure 1 is substantially a central vertical sectional view of the device; Fig. 2 is a vertical sectional view at right angles to Fig. 1; Fig. 3 is a sectional view of shutter and part of hopper at line 3—3; Fig. 4 shows outlet hole in hopper with shutter partly closed. Like numerals indicate corresponding parts in the different figures of the drawings. 1 is outside wall of hopper; 2 is centrally located wheel; 3—3 are brushes made of stiff springy bristles set in circumference of wheel 2 at an angle to its radius, slanting in the direction opposite to which the wheel revolves; 4 is shaft extending through hopper; 5 is boxing attached to wheel 2 and to shaft 4; 6—6 are boxings attached to outside wall of hopper 1, in which shaft 4 revolves; 7 is drive sprocket attached to shaft 4 and connected by sprocket chain to drive wheel of drill, (drive wheel not shown); 8—8 are partition walls in hopper placed one on each side of wheel 2 to prevent seed from interfering with action of wheel 2 when in operation; 9—9 are holes in the lower part of partition walls 8—8 to admit seed to angle formed by hopper wall 1 between partition walls 8—8; 10—10 are slides attached to sides of partition walls 8—8 in such manner that they may be moved up or down, to open or close holes 9—9, to admit the right quantity of seed to channel in bottom of hopper between walls 8—8; 11 is handle connecting slides 10—10 so they may be operated as a unit; 12 is triangular hole in channel formed by angle of hopper walls between walls 8—8 through which seed is forced by spring of brushes 3—3; 13 is shutter fitting snugly into channel formed by angle of hopper walls in such manner as to allow it to be moved up or down to regulate size of outlet hole 12; 14 is handle with ends extending through slot in walls of hopper 1 and attached to shutter 13; 15 is plate attached to hopper 1 over outlet hole 12 to prevent brushes 3—3 from throwing seed too far.

In practice the sprocket wheel being driven by sprocket chain attached to drive wheel of drill, (drive wheel not shown), causes wheel 2 to revolve in direction indicated by arrow; the hopper being filled with seeds the slides 10—10 are raised sufficiently to admit enough seed continuously to channel between walls 8—8, to keep the brushes always supplied with seed but not enough to interfere with easy action of wheel 2. The height slides 8—8 are raised being adapted to size and quantity of seed being sown.

As wheel 2 revolves the brushes sweep the seed along the channel formed by the angle of the hopper, across the bottom of the hopper and up one side as far as outlet hole 12; the brushes being made of stiff springy bristles, and the distance between the circular bottom and side of hopper, and circumference of wheel 2 being shorter than the brushes, causes the ends of the brushes to be sprung backward and press against the angle of seed channel and force the seed through the outlet hole as the ends of the brushes pass it. The brushes being set slanting backward to the radius of wheel 2 and their springiness causes them to keep the seed always pressed against the apex of the angle of the seed channel and prevents the seed from falling away from apex of seed channel while being raised up the side of the hopper to outlet hole 12 where they are expelled into seed spout in full view of the operator, which is one of the advantages of this device.

The outlet hole 12 being V shaped with the wider end uppermost and in the direction the brushes are moving prevents any clogging of seed as they are expelled, and the lower end of shutter 13 being parallel with top line of hole 12, the outlet hole always remains the same shape at whatever place the shutter is set in controlling size of hole 12; shutter 13 being of thin material and placed inside the outside wall of hopper tends to scrape the seed from the ends of the brushes as the brushes are sprung against it in passing.

The top part of the hopper being slightly wider than the inside circumference of the circular part, it allows the brushes to straighten out, doing away with the friction of the ends of the brushes against the wall of the hopper during part of their revolution, thus requiring less power for operation of wheel 2.

Having thus described my invention, what I claim as new is:

1. In a seed hopper and sowing mechanism, a centrally located wheel and means for revolving the same, said wheel being provided with stiff springy brushes extending from its circumference at an angle to its radius in the opposite direction to which it revolves, a channel in the hopper into which the ends of said brushes fit, said channel forming the segment of a circle concentric to the circumference of the wheel and extending across the bottom and up one side of the hopper, a V shaped outlet hole to which said channel extends, a shutter by which the size of said outlet hole is regulated, the lower end of said shutter being parallel to the upper side of the V shaped hole in the channel of the hopper.

2. In a seed hopper and sowing mechanism, a centrally located wheel with brushes extending from its circumference at an angle to its radius, a seed channel in the hopper, said brushes by their springiness fitting their ends snugly to the angle of said seed channel, and by their angle to the radius of said wheel holding the seed against the angle of said channel, a V shaped outlet hole in the seed channel, and a seed spout into which the seed is expelled in full view of the operator.

3. In a seed hopper and sowing mechanism, a centrally located wheel with means for revolving the same, said wheel being provided with stiff springy brushes extending from its circumference, a seed channel in the hopper forming a segment of a circle concentric to the circumference of said wheel and at such distance from said wheel as to cause brushes attached to said wheel to spring slightly backward in passing through said channel as the wheel revolves, partition walls placed across the hopper one each side of the centrally located wheel separating the seed channel from the rest of the hopper, a hole in the lower edge of each partition wall where it joins the bottom of the hopper, and suitable slides adapted to open and close said holes to admit the right quantity of seed to said channel.

4. In a seed hopper and sowing mechanism, a centrally located wheel and means for revolving the same, said wheel being provided with brushes extending from its circumference at an angle to its radius slanting in the opposite direction to which the wheel revolves, a seed channel extending across the bottom and up one side of the hopper forming the segment of a circle parallel to the circumference of said wheel, at such distance from the wheel as to cause the brushes to bend in the opposite direction to which the wheel revolves while their ends are passing through said channel, a V shaped outlet hole near upper end of said channel, a shutter to regulate the size of said hole in such manner as to leave the outlet hole always the same shape when opened to any size required, partition walls extending across said hopper parallel to the sides of said centrally located wheel, openings in the lower edges of said walls where they join the bottom of the hopper, and suitable slides to regulate the size of said openings and adapted to admit more or less seed to the seed channel, the outside walls of the hopper forming the angle of the seed channel between the said partition walls.

In testimony that I claim the foregoing, I have hereunto set my hand in the presence of two witnesses, this 24th day of March, 1920.

EDMUND BOW.

Witnesses:
 JOHN T. WENTZ,
 D. J. CLARK.